May 22, 1945.  H. B. WOLPER  2,376,410
BEVERAGE BREWER AND FILTER
Filed June 30, 1943
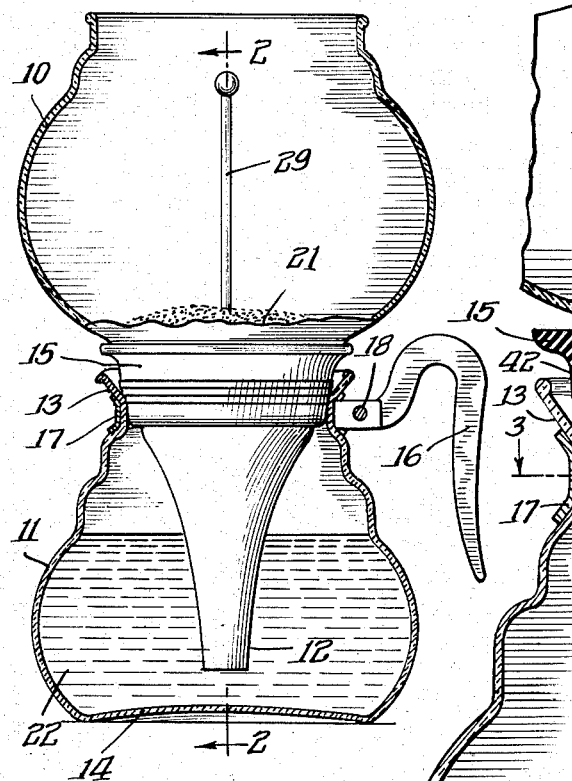
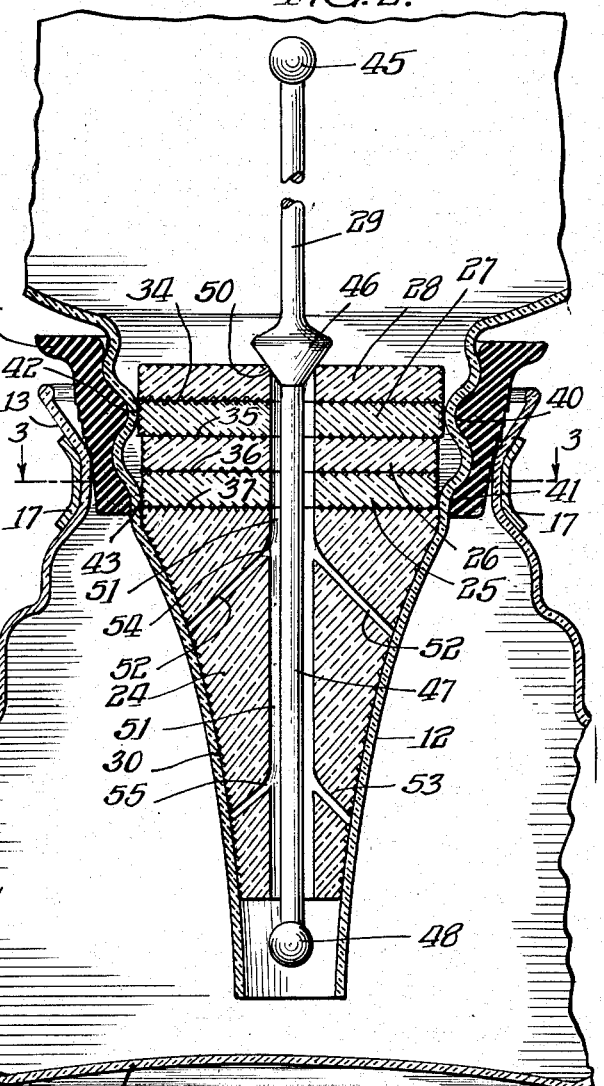
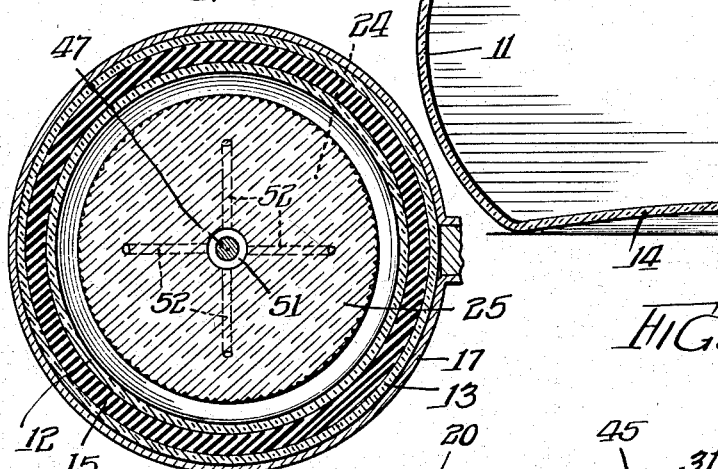
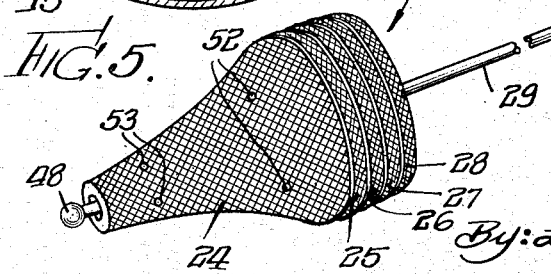
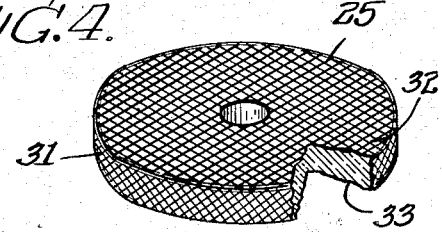
INVENTOR.
Harry B. Wolper
By: Loftus, Moore, Olson & Trexler
Attys Patented May 22, 1945

2,376,410

UNITED STATES PATENT OFFICE 2,376,410

BEVERAGE BREWER AND FILTER

Harry B. Wolper, Chicago, Ill.

Application June 30, 1943, Serial No. 492,820

6 Claims. (Cl. 99—292)

This invention relates to beverage brewers of the vacuum type, and more particularly to filter devices for use therewith.

It is an object of the invention to provide a beverage brewer of the vacuum type, such as for coffee and the like, and associated filter devices, of improved construction and operating characteristics. More specifically stated, it is an object of the invention to provide a filter arrangement for beverage brewers of the type defined which will effect an insured and more complete filtering action on the beverage mix, whereby to effectively separate the brewed liquid from the grounds and other solid matter.

A further object of the invention is to provide an improved filter for use in devices of the class defined, which filter will effect an insured and adequate filtering action on the brewed mix, but which employs no metal or cloth and can be made entirely of glass or porcelain or other desired material.

A still further object of the invention is to provide a filter unit for devices of the type defined, which filter unit comprises a valve portion and a filter or strainer portion, the valve portion being operable to permit the ready passage of liquid through the unit in one direction, and the filter or strainer portion being operable to effect an insured and adequate filtering action upon the liquid during its passage through the unit in the opposite direction.

Various other objects, advantages and features of the invention will be apparent from the following specification when taken in connection with the accompanying drawing, wherein a preferred embodiment of the invention is set forth for purposes of illustration.

In the drawing, wherein like reference numerals refer to like parts throughout:

Fig. 1 is a general assembly view, partly in section, of a beverage brewer, for coffee and the like, constructed in accordance with the principles of the invention, and embodying the filter unit thereof;

Fig. 2 is a partial detail sectional view, on an enlarged scale, of the structure of Fig. 1 and taken as indicated by the line 2—2 thereof;

Fig. 3 is a horizontal sectional view of the structure of Fig. 2, on the line 3—3 thereof;

Fig. 4 is a detail perspective view of one of the strainer elements of the filter unit; and Fig. 5 is a perspective view of the complete filter unit, ready for application to and use with the brewer bowls or containers.

Referring more specifically to the drawing, and first to Figs. 1 and 2 thereof, a beverage brewer of the type adapted for the brewing of coffee and the like is illustrated, comprising an upper container or bowl member 10 and a lower container or bowl member 11. The upper bowl has a funnel-shaped depending tube portion 12 adapted to project through the neck 13 of the lower bowl, to a position adjacent the lower platform portion 14 of the lower bowl. A gasket member 15, of rubber or other suitable material, embraces the depending tube adjacent its upper portion as shown, and is normally supported by and interlocked therewith. As the upper bowl is arranged in superposed position upon the lower bowl, as shown in Figs. 1 and 2, this gasket member is adapted to form an air and liquid-tight seal between the container bowls. The lower bowl is also provided with a handle 16 secured to the bowl neck by suitable means such as an annular band 17 embracing the bowl neck and secured to the handle by means of a bolt or screw 18.

A filter unit, generally indicated by the number 20, is adapted to be disposed within the upper bowl, in engagement with and supported by the depending tube 12 thereof. As will be understood, this filter unit is adapted to form the support for the grounds 21 of coffee or the like placed into the upper bowl when the structure is in use. The filter unit is also adapted to permit the liquid 22 in the lower bowl to pass upwardly into the upper bowl, and into contact with the coffee grounds, as heat is applied to the lower bowl in the usual manner, and thereafter to permit the return of the brewed liquid into the lower bowl, as the source of heat is removed.

The filter unit comprises a generally conically-shaped lower member 24, a series of discs 25, 26, 27 and 28 arranged in superposed relation upon the lower conical member, and a central stem 29 adapted to extend vertically through alined holes in the discs and in said lower conical member 24. The conical member 24 has its outer peripheral surface shaped to conform accurately to the curvature of the depending tube 12 of the upper bowl member, the outer surface of the conical filter member also being suitably roughened as indicated, whereby to provide a multiplicity of restricted filtering passages as indicated at 30, Fig. 2, between the filter member and the tube 12 when the filter is in operative position. This roughening of the outer surface of the conical filter member may be suitably effected as the filter member is molded or formed, the filter member preferably being of glass or porcelain, or certain types of plastics or other suitable material may be used, if desired. As best shown in Fig. 4, the several discs 25, 26, 27 and 28 are also suitably roughened both on their outer peripheral surfaces 31 and on their flat surfaces 32 and 33 whereby to provide a series of filtering passages 34, 35, 36 and 37 between the discs and between the lowermost disc and the upper surface of the conical filter member 24. In this connection the upper surface of the conical filter member may also be roughened, for cooperation with the disc 25, in the formation of the filter passage 37. The discs 25, 26, 27 and 28 may be formed of material similar to that of the conical filter member 24.

The discs 27 and 28 are slightly larger than the discs 25 and 26, the disc 27 being sized for cooperation with the flange portion 40 of the upper bowl, and the disc 25 being sized for cooperation with the bowl flange portion 41. It is intended that the filter unit may be insertable freely into the upper bowl and into the position shown in Figs. 1 and 2, and accordingly a tight fit is not contemplated between the discs and the bowl flanges. However, a relatively close fit, within manufacturing tolerances, is contemplated whereby to provide additional filter passages as indicated at 42 and 43, which filter passages cooperate with the other filter passages provided in the unit in effecting the desired filtering action upon the brewed liquid. The relatively close fit between the discs and the bowl flanges 40 and 41 also aids in centering and maintaining the filter unit in proper supported position.

The central stem member 29 comprises an upper handle portion 45, a valve portion 46, a stem portion 47 adapted to extend loosely through the alined central openings in the discs and in the conical filter member 24, and a lowermost enlarged or ball portion 48 formed on the lower end of the stem portion 47. The valve portion 46 and the ball portion 48 are both sufficiently large so that they cannot be passed through the alined openings in the discs and in the filter member 24. However, the ball and valve portions are sufficiently spaced apart, or stated another way, the stem portion 47 is of sufficient length with respect to the length of the filter member 24 and of the four superposed discs, so as to permit the stem 29 to have a limited vertical movement with respect to the filter members.

The stem member 29 is preferably formed of one piece molded structure, and may be formed of a material similar to that of the filter discs 25, 26, 27 and 28, and the conical filter member 24. The valve portion 46 of the stem is preferably smooth whereby to form valve contact with the upper surface of the disc 28, as indicated at 50 in Fig. 2, an accurate and relatively fluid-tight fit between the valve and the disc at the point 50 being contemplated when the parts are in the position shown.

The loose extension of the stem portion 47 through the alined openings in the discs and in the conical filter member 24 forms a central annular opening 51 extending vertically through the filter unit. The conical filter member 24, as best shown in Figs. 2 and 5, is provided with a series of generally radially extending passages 52 and 53 communicating with this central annular passage 51. In the particular embodiment illustrated there are four such radial passages 52, and four passages 53, see Fig. 3. The inner ends of the passages are shaped as indicated at 54 and 55, Fig. 2, so that liquid descending through the annular passage 51 tends to be caught by and flow outwardly through the passages 52 and 53.

In operation, as the lower bowl or container 11 is subjected to heat, the vapor pressure formed therein forces the liquid 22 from the lower bowl into the upper bowl 10 and into contact with the coffee grounds 21 therein. Free and relatively unrestricted upward passage of the liquid is permitted through the relatively unrestricted central annular conduit 51 and past the valve seat 50, the valve member 46 and associated stem being raised by fluid pressure to permit the relatively unrestricted upward fluid flow. After the liquid has been commingled with the grounds 21, and upon the removal of heat from the lower bowl, the vacuum formed therein draws the brewed beverage downwardly into the lower bowl. In this downward passage of the liquid the valve 46 is in the position illustrated in Fig. 2, thereby closing the valve seat 50. Accordingly the liquid is caused, during its downward flow, to pass through the various parallel filtering passages 34, 35, 36 and 37, and through the filtering passages 42, 43 and 30 to effect a filtering action upon the brewed liquid, separating the liquid from the grounds 21 and other solid foreign matter. It will be seen that the filter unit is thus composed of two parts including a valve 46 which shifts to permit the relatively unrestricted upward flow of the liquid, and thereafter closes, and the several filter elements 24, 25, 26, 27 and 28 which do not shift and which are maintained in position to effect a proper filtering action upon the liquid during its downward flow.

It will be seen that a plurality of parallel filtering passages are provided whereby to increase the filtering capacity of the unit, but at the same time each filtering passage is sufficiently extended and may be made sufficiently restricted so that an adequate filtering action is obtained. In this connection it will be noted that the liquid which passes through the filtering passages 34, 35, 36 and 37, and thereafter flows downwardly through the annular channel 51 is in the main caught and passed outwardly through channels 52 and 53 and thereafter subjected to the further filtering action of the relatively elongated filtering passage 30. The members 24, 25, 26, 27 and 28 forming the filtering elements of the unit are always maintained in fixed position during the operation. Grounds or other foreign matter accordingly does not tend to become lodged between the filter surfaces, so that the filter passages always remain in proper position. This fact, coupled with the extended length of the passages, insures an adequate filtering of the liquid and a clear beverage as the brewed liquid is restored to the lower container or bowl 11. Foreign matter does not tend to become lodged into the relatively sharp valve seat 50. The perforated and multiple character of the filter unit, as shown, permits the use of a two-part structure comprising the valve 46 on the one hand and the several filters or strainer elements 24, 25, 26, 27 and 28 on the other, and also permits the use of the several parallel filter flow paths for the liquid.

In the event that the upstanding handle portion 45 of the stem is inadvertently struck as the coffee is stirred, any tendency to disturb the proper justaposition of the filter surfaces is minimized by reason of the relatively close fit between the discs 27 and 25 and the juxtaposed bowl flanges 40 and 41, as well as by the fit of the conical filter member 24 into the funnel shaped tube 12 of the upper bowl. At the same time the filter unit is freely removable as a unit by means of the handle 45 from the bowl 10, and upon removal, due to the spacing between the valve 50 and the ball 48, the several filter or strainer elements 24, 25, 26, 27 and 28 are readily separable within limits to permit rinsing and cleaning operations.

The entire filter unit may be constructed of the desired material best suited to facilitate flavor in the particular beverage to be brewed. For example, in the brewing of coffee, the entire filter unit may preferably be constructed of glass or porcelain. The use of metal and cloth is thus avoided, and there are no parts to wear out requiring replacement, or no parts to become contaminated. In the brewing of other beverages different preferred materials may be selected including metal if it were to be desired in any particular instance.

It is obvious that various changes may be made in the specific embodiments set forth for purposes of illustration without departing from the spirit of the invention. Accordingly the invention is not to be limited to the specific embodiments shown and described, but only as indicated in the following claims.

The invention is hereby claimed as follows:

1. A filter unit for use with beverage brewers of the type comprising two superposed and interconnected container bowls for liquid, the upper bowl having a conically-shaped tube extending into the lower bowl, said filter unit being adapted to be disposed between the interconnected bowls, and said filter unit comprising a conically-shaped filter member arranged to interfit with said conical tube, and a filter disc disposed on the conically-shaped filter member in superposed relation, a filter passage for liquid being formed between the contacting surfaces of the disc and conically-shaped member.

2. A filter unit for use with beverage brewers of the type comprising two interconnected container bowls for liquid, said filter unit being adapted to be disposed between the interconnected bowls, and said filter unit comprising a plurality of superposed relatively shiftable parts, there being filter passages for liquid disposed between the contacting surfaces of said parts and along the outer periphery of at least one of said parts between said part and one of the container bowls, said parts also being formed with a vertical passage extending collectively therethrough, an elongated stem member in said passage, said stem member having means thereon for limiting the relative separation of said parts and for closing said passage.

3. A beverage brewer comprising an upper container bowl and a lower container bowl adapted to be disposed in superposed relation, the upper container bowl having a generally conically-shaped tube extending into the lower container bowl to a position adjacent the lower portion thereof, and a filter unit adapted to be disposed within said conically-shaped tube, said filter unit comprising a conically-shaped member to conform with the shaping of said tube, said conically-shaped member and tube forming filter passages therebetween, a disc member mounted on the conically-shaped member forming additional filter passages along the upper surface of said conically-shaped member, and a rod extending through substantially centrally disposed openings in the disc member and conically-shaped member, said rod being formed with positive abutment means for limiting the separation of said disc member and said conically-shaped member.

4. A filter unit as defined in claim 1 wherein additional discs are provided in superposed relation upon said first mentioned filter disc providing additional liquid filter passages.

5. A filter unit as defined in claim 1 wherein said conically-shaped filter member and said filter disc are provided with aligned openings, and wherein a rod is arranged within said openings, said rod being provided with abutment means for limiting the separation of the filter disc and said conically-shaped filter member.

6. A filter unit as defined in claim 1 wherein said conically-shaped filter member and said filter disc are provided with aligned openings, and wherein a rod is arranged within said openings, said rod being provided with an upstanding handle portion and abutment means for limiting the separation of the filter disc and said conically-shaped filter member.

HARRY B. WOLPER.